(12) United States Patent
Li et al.

(10) Patent No.: US 10,939,318 B2
(45) Date of Patent: Mar. 2, 2021

(54) DATA PACKET TRANSMISSION METHOD, SENDING DEVICE, AND RECEIVING DEVICE

(71) Applicant: Huawei Technologies Co., Ltd., Shenzhen (CN)

(72) Inventors: Yexing Li, Shanghai (CN); Yan Wang, Shanghai (CN); Wentao Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 16/517,094

(22) Filed: Jul. 19, 2019

(65) Prior Publication Data
US 2019/0342785 A1 Nov. 7, 2019

Related U.S. Application Data

(63) Continuation of application No. PCT/CN2017/072191, filed on Jan. 23, 2017.

(51) Int. Cl.
*H04W 28/02* (2009.01)
*H04L 1/16* (2006.01)
*H04W 80/08* (2009.01)

(52) U.S. Cl.
CPC ....... *H04W 28/0268* (2013.01); *H04L 1/1642* (2013.01); *H04W 28/0263* (2013.01); *H04W 80/08* (2013.01)

(58) Field of Classification Search
CPC ......... H04W 28/0268; H04W 28/0263; H04W 80/08; H04W 60/005; H04L 1/1642; H04L 69/16; H04L 63/0272; H04L 47/2425
See application file for complete search history.

(56) References Cited

U.S. PATENT DOCUMENTS

| | | | |
|---|---|---|---|
| 9,924,516 B1 * | 3/2018 | Naim | H04W 72/0453 |
| 10,284,477 B2 * | 5/2019 | Sachs | H04L 47/2491 |
| 2009/0238192 A1 * | 9/2009 | Dolganow | H04L 47/2425 |
| | | | 370/400 |
| 2011/0078783 A1 | 3/2011 | Duan et al. | |

(Continued)

FOREIGN PATENT DOCUMENTS

| | | |
|---|---|---|
| CN | 1859300 A | 11/2006 |
| CN | 101404650 A | 4/2009 |

(Continued)

*Primary Examiner* — Ayaz R Sheikh
*Assistant Examiner* — Louis Samara
(74) *Attorney, Agent, or Firm* — Leydig, Voit & Mayer, Ltd.

(57) ABSTRACT

A data packet transmission method includes: obtaining, by a sending device, a data packet; determining, by the sending device, quality of service of the data packet; adding, by the sending device, an identifier and a sequence number to the data packet based on the quality of service of the data packet, where if the quality of service of the data packet belongs to first quality of service, the sending device adds a first identifier and a first sequence number to the data packet; or if the quality of service of the data packet belongs to second quality of service, the sending device adds a second identifier and a second sequence number to the data packet; and sending, by the sending device, the data packet to which the identifier and the sequence number have been added.

6 Claims, 11 Drawing Sheets

(56) References Cited

U.S. PATENT DOCUMENTS

| | | | |
|---|---|---|---|
| 2012/0087313 A1* | 4/2012 | Yin | H04W 68/005 |
| | | | 370/328 |
| 2012/0144062 A1 | 6/2012 | Livet et al. | |
| 2014/0003394 A1* | 1/2014 | Rubin | H04L 43/0817 |
| | | | 370/331 |
| 2015/0156663 A1* | 6/2015 | Wang | H04W 28/08 |
| | | | 370/235 |
| 2016/0037428 A1 | 2/2016 | Kanugovi et al. | |
| 2018/0123950 A1* | 5/2018 | Garg | H04L 63/0236 |

FOREIGN PATENT DOCUMENTS

| | | |
|---|---|---|
| CN | 101978677 A | 2/2011 |
| CN | 102035814 A | 4/2011 |
| WO | 2011153415 A1 | 12/2011 |

* cited by examiner

DATA PACKET TRANSMISSION METHOD, SENDING DEVICE, AND RECEIVING DEVICE

CROSS-REFERENCE TO RELATED APPLICATIONS

This application is a continuation of International Patent Application No. PCT/CN2017/072191, filed on Jan. 23, 2017, the disclosure of which is hereby incorporated by reference in its entirety.

TECHNICAL FIELD

This application relates to the communications field, and in particular, to a data packet transmission method, a sending device, and a receiving device.

BACKGROUND

In the prior art, a plurality of access technologies are used in a core network for convergence purposes. Specifically, the plurality of access technologies may be used to converge traffic of a plurality of paths to improve service bandwidth. Per-packet forwarding means forwarding all packets of one flow on different links in specific proportions. In such a forwarding mode, bandwidth of the plurality of links can be fully utilized and bandwidth utilization is increased. However, the per-packet forwarding may cause the following problem: Because the plurality of links have varying quality, transmission of data packets is severely out of order, the out-of-order data packets deteriorate performance of a Transmission Control Protocol (TCP) or affect user experience, and the data packets need to be re-sorted at a receive end, so that the data packets of the same flow are not additionally out of order due to the transmission using the plurality of access technologies.

To resolve the out-of-order problem of the multi-path per-packet forwarding, a Network Convergence Protocol (NCP) is accessed at a user plane gateway or a control plane gateway of a core network and a user equipment (UE), to number and distribute data packets at a start point of the multi-path forwarding, and converge and sort the multi-path data packets at a convergence point of the multi-path forwarding.

However, NCP numbers do not reflect Quality of Service (QoS) indicator information of different flows, and the re-sorting causes a failure of a QoS mechanism of a radio access network (RAN). To be specific, the NCP numbers downlink data packets that sequentially arrive; and when the data packets arrive at a RAN side, a sending order of data packets of different QoS classes changes, and a high-priority data packet should preferably arrive at a UE side. However, because the data packets carry NCP numbers, the data packet that preferably arrives at the UE side cannot be delivered to an Internet Protocol (IP) layer and an application layer. Consequently, user experience of a high-priority application is not improved, and QoS scheduling of the RAN does not take effect.

SUMMARY

Embodiments of this application provide a data packet transmission method, a sending device, and a receiving device, so that the receiving device may classify data packets based on identifiers included in the data packets, re-sort the data packets based on respective sequence numbers, and provide a plurality of re-sorted data packets for an upper layer of the receiving device for processing. Therefore, the receiving device does not need to wait until all the data packets sent by the sending device are received and then sort the data packets and send sorted data packets to an upper-layer application for processing. In this way, a QoS mechanism of a network takes effect, and user experience of a high-priority application is effectively improved.

A first aspect of the embodiments of this application provides a data packet transmission method. The method may include: A sending device obtains a data packet. A quantity of the data packet obtained by the sending device is not limited herein but is determined based on an actual application. The sending device determines quality of service of the data packet. The sending device adds an identifier and a sequence number to the data packet based on the quality of service of the data packet, where if the quality of service of the data packet belongs to first quality of service, the sending device adds a first identifier and a first sequence number to the data packet; or if the quality of service of the data packet belongs to second quality of service, the sending device adds a second identifier and a second sequence number to the data packet. It should be understood that the identifier herein is determined based on the quality of service and may be a quality of service identifier, a flow type identifier, or the like. The first quality of service is different from the second quality of service. Herein, in addition to the first quality of service and the second quality of service, other quality of service such as third quality of service may be included. Further, data packets belonging to different quality of service are independently numbered by the sending device and do not affect each other. The sending device sends the data packet to which the identifier and the sequence number have been added.

In this embodiment of this application, it should be noted that when the sending device is a core network device, a receiving device is user equipment; or when the sending device is user equipment, a receiving device is a core network device. After obtaining the data packet, the sending device may determine the quality of service of the data packet based on the data packet, and then determine, based on the quality of service, the identifier corresponding to the data packet. The sending device adds the corresponding identifier and sequence number to the data packet, and then sends the data packet to which the identifier and the sequence number have been added. In this way, after receiving the data packet, the receiving device may determine, based on the identifier of the data packet, an identifier queue to which the identifier belongs, and perform sorting based on the sequence number of the data packet. Therefore, the identifier and the sequence number that are added by the sending device to the data packet are prepared for the receiving device, so that the receiving device processes the data packet more conveniently and effectively.

With reference to the first aspect of the embodiments of this application, in a first implementation of the first aspect of the embodiments of this application, that the sending device adds an identifier and a sequence number to the data packet based on the quality of service of the data packet may include: the sending device adds the identifier and the sequence number to a network convergence protocol header of the data packet based on the quality of service of the data packet. It should be understood that herein the sending device first needs to determine the corresponding identifier based on the quality of service of the data packet, and then adds the identifier and the sequence number to the data packet.

In this embodiment of this application, specifically, an implementation of adding the identifier and the sequence number to the data packet is provided: adding the identifier and the sequence number to the network convergence protocol NCP header of the data packet. In this way, feasibility of this solution is improved.

With reference to the first aspect of the embodiments of this application and the first implementation of the first aspect of the embodiments of this application, in a second implementation of the first aspect of the embodiments of this application, that the sending device determines quality of service of the data packet may include: the sending device determines a first traffic flow template based on internet protocol IP quintuple information of the data packet. The first traffic flow template herein may include IP quintuple information of a plurality of data packets, and may be determined based on an actual application. The identifier includes a first quality of service identifier. That the sending device adds an identifier and a sequence number to the data packet based on the quality of service of the data packet may include: the sending device obtains the first quality of service identifier based on the first traffic flow template; and the sending device adds the first quality of service identifier and the sequence number to the data packet.

In this embodiment of this application, the sending device may first determine the corresponding first traffic flow template based on the IP quintuple information of the data packet, and then obtain the first quality of service identifier based on the first traffic flow template and add the first quality of service identifier and the sequence number to the data packet. This elaborates on this solution and improves feasibility. In addition, because the quality of service identifier is determined based on the first traffic flow template, a priority-based scheduling policy of preferably sending a high-priority data packet has been reflected. In this case, the receiving device also correspondingly receives the high-priority data packet first and may process the high-priority data packet first. Therefore, the receiving device does not need to wait until all data packets sent by the sending device are received and then sort the data packets and send sorted data packets to an upper-layer application for processing. In this way, a QoS mechanism of a RAN takes effect, and user experience of a high-priority application is effectively improved.

With reference to the second implementation of the first aspect of the embodiments of this application, in a third implementation of the first aspect of the embodiments of this application, the sending device may obtain the first quality of service identifier based on the first traffic flow template in the following several implementations:

(1) The sending device determines, based on a preset first mapping information table between a traffic flow template and a quality of service identifier, the first quality of service identifier corresponding to the first traffic flow template. It should be noted that in the preset first mapping information table between a traffic flow template and a quality of service identifier, the quality of service identifier (QoS ID) is allocated by a control plane network element CP of the sending device in initiating a process of an attachment request or a session creation request. After receiving the QoS ID, a user plane network element UP sets up a correspondence between the QoS ID and a Traffic Flow Template (TFT).

(2) The sending device searches a second mapping information table between a traffic flow template and a quality of service identifier, and if the first quality of service identifier corresponding to the first traffic flow template is found, the sending device obtains the first quality of service identifier. For example, the second mapping information table between a traffic flow template and a quality of service identifier is stored in the sending device. In this implementation, data packets are numbered based on QoS IDs, mapping information between a QoS ID and a TFT is stored in a UP in real time, and the user plane network element UP temporarily allocates a correspondence between a QoS ID and a TFT.

(3) The sending device searches a second mapping information table between a traffic flow template and a quality of service identifier, and if the first quality of service identifier corresponding to the first traffic flow template is not found, the sending device allocates the first quality of service identifier corresponding to the first traffic flow template, and the sending device adds mapping information between the first traffic flow template and the first quality of service identifier to the second mapping information table. For example, the second mapping information table that is between a traffic flow template and a quality of service identifier and that is stored in the sending device may be updated in real time. In this implementation, data packets are also numbered based on QoS IDs, mapping information between a QoS ID and a TFT is stored in a UP in real time, and the user plane network element UP temporarily allocates a correspondence between a QoS ID and a TFT.

(4) The sending device determines a corresponding quality of service class identifier QCI based on the first traffic flow template, and the sending device converts the QCI to obtain the first quality of service identifier. In this implementation, QoS IDs of data packets are in a one-to-one correspondence with quality of Quality of service Class Identifier (QCI). In this way, the QoS ID is indicated by using a limited quantity of bits. In an existing EPC, all QCIs can be indicated by using only 4 bits.

In this embodiment of this application, several optional implementations of determining the quality of service identifier by the sending device are provided, so that this solution of this application is more comprehensive and flexible. The first quality of service identifier may be obtained by searching the preset first mapping information table, or the first quality of service identifier may be determined by using the temporarily allocated second mapping information table, or the first quality of service identifier may be obtained by converting the QCI. A user may select any implementation based on an actual requirement of the user.

With reference to the first aspect of the embodiments of this application and the first implementation of the first aspect of the embodiments of this application, in a fourth implementation of the first aspect of the embodiments of this application, the identifier includes a first flow type identifier, and that the sending device determines quality of service of the data packet may include: the sending device determines a first flow type based on IP quintuple information of the data packet; and that the sending device adds an identifier and a sequence number to the data packet based on the quality of service of the data packet may include: the sending device obtains the first flow type identifier based on the first flow type; and the sending device adds the first flow type identifier and the sequence number to the data packet.

In this embodiment of this application, the sending device may first determine the corresponding first flow type based on the IP quintuple information of the data packet, and then obtain the first flow type identifier based on the first flow type and add the first flow type identifier and the sequence number to the data packet. This elaborates on this solution and improves feasibility. In addition, because the flow type identifier is determined based on the first flow type, a priority-based scheduling policy of preferably sending a high-priority data packet has been reflected. In this case, the receiving device also correspondingly receives the high-priority data packet first and may process the high-priority data packet first. Therefore, the receiving device does not need to wait until all data packets sent by the sending device are received and then sort the data packets and send sorted data packets to an upper-layer application for processing. In this way, a QoS mechanism of a RAN takes effect, and user experience of a high-priority application is effectively improved.

With reference to the fourth implementation of the first aspect of the embodiments of this application, in a fifth implementation of the first aspect of the embodiments of this application, the sending device may obtain the first flow type identifier based on the first flow type in the following implementations:

(1) The sending device searches a correspondence information table between a flow type and a flow type identifier, and if the first flow type identifier corresponding to the first flow type is found, the sending device obtains the first flow type identifier.

(2) The sending device searches a correspondence information table between a flow type and a flow type identifier, and if the first flow type identifier corresponding to the first flow type is not found, the sending device allocates the first flow type identifier corresponding to the first flow type, and the sending device adds a correspondence between the first flow type and the first flow type identifier to the correspondence information table.

In this embodiment of this application, several optional implementations of determining the flow type identifier by the sending device are provided, so that this solution of this application is more comprehensive and flexible. The flow type identifier may be determined by using a correspondence information table that is updated in real time, or the flow type identifier may be allocated based on the flow type. A user may select any implementation based on an actual requirement of the user.

A second aspect of the embodiments of this application provides a data packet transmission method. The method may include: A receiving device receives a plurality of data packets, where each of the plurality of data packets includes a first identifier or a second identifier and a corresponding sequence number. It should be understood that in addition to the first identifier or the second identifier, an identifier included in each of the plurality of data packets may be another identifier, and the first identifier is different from the second identifier. The receiving device performs first sorting on data packets with the first identifier in the plurality of data packets based on respective sequence numbers, and performs second sorting on data packets with the second identifier based on respective sequence numbers. Herein, data packets with different identifiers may be put into different queues for sorting. The receiving device provides a plurality of sorted data packets for an upper layer of the receiving device for processing.

In this embodiment of this application, when a sending device is a core network device, the receiving device is user equipment; or when a sending device is user equipment, the receiving device is a core network device. Each of the plurality of data packets includes the first identifier or the second identifier and the corresponding sequence number. The receiving device performs first sorting on the data packets with the first identifier in the plurality of data packets based on the respective sequence numbers, and performs second sorting on the data packets with the second identifier based on the respective sequence numbers. The receiving device provides the plurality of sorted data packets for the upper layer of the receiving device for processing. Because the sending device determines quality of service based on a data packet and then adds an identifier based on the quality of service, a priority-based scheduling policy of preferably sending a high-priority data packet has been reflected. In this case, the receiving device also correspondingly receives the high-priority data packet first. The receiving device may classify the data packets based on the identifiers included in the data packets, and then re-sort the data packets based on the respective sequence numbers and provide the plurality of re-sorted data packets for the upper layer of the receiving device for processing. Therefore, the receiving device does not need to wait until all data packets sent by the sending device are received and then sort the data packets and send sorted data packets to an upper-layer application for processing. In this way, a QoS mechanism of a network takes effect, user experience of a high-priority application is effectively improved, and time is further saved.

With reference to the second aspect of the embodiments of this application, in a first implementation of the second aspect of the embodiments of this application, the first identifier or the second identifier includes a quality of service identifier or a flow type identifier.

With reference to the second aspect of the embodiments of this application and the first implementation of the second aspect of the embodiments of this application, in a second implementation of the second aspect of the embodiments of this application, that the receiving device performs first sorting on data packets with the first identifier in the plurality of data packets, and performs second sorting on data packets with the second identifier may include: the receiving device performs first sorting on the data packets with the first identifier in the plurality of data packets according to a sequence number consecutiveness, ascending, or descending rule, and performs second sorting on the data packets with the second identifier according to the sequence number consecutiveness, ascending, or descending rule.

In this embodiment of this application, several bases by which data packets with different identifiers are sorted are provided and are specified by the sending device and the receiving device in a protocol in advance.

A third aspect of the embodiments of this application provides a sending device. The sending device has a function of preferably processing a high-priority data packet according to a QoS mechanism of a network in the first aspect. The function may be implemented by hardware or corresponding software executed by hardware. The hardware or the software includes one or more modules corresponding to the foregoing function.

A fourth aspect of the embodiments of this application provides a receiving device. The receiving device has a function of preferably processing a high-priority data packet according to a QoS mechanism of a network in the second aspect. The function may be implemented by hardware or corresponding software executed by hardware. The hardware or the software includes one or more modules corresponding to the foregoing function.

A fifth aspect of the embodiments of this application provides a sending device. The sending device may include:

a transceiver, a processor, a memory, and a bus, where the transceiver, the processor, and the memory are connected by using the bus;

the memory is configured to store an operation instruction;

the processor is configured to: determine quality of service of a data packet, and add an identifier and a sequence number to the data packet based on the quality of service of the data packet, where if the quality of service of the data packet belongs to first quality of service, the processor adds a first identifier and a first sequence number to the data packet; or if the quality of service of the data packet belongs to second quality of service, the sending device adds a second identifier and a second sequence number to the data packet; and the transceiver is configured to: obtain the data packet and send the data packet to which the identifier and the sequence number have been added.

A sixth aspect of the embodiments of this application provides a receiving device. The receiving device may include:

a transceiver, a processor, a memory, and a bus, where the transceiver, the processor, and the memory are connected by using the bus;

the memory is configured to store an operation instruction;

the processor is configured to: perform first sorting on data packets with a first identifier in a plurality of data packets based on respective sequence numbers, and perform second sorting on data packets with a second identifier based on respective sequence numbers; and the transceiver is configured to: receive the plurality of data packets, where each of the plurality of data packets includes the first identifier or the second identifier and a corresponding sequence number, and provide a plurality of sorted data packets for an upper layer of the receiving device for processing.

A seventh aspect of the embodiments of this application provides a communications system. The communications system includes a sending device and a receiving device. The sending device is the sending device that performs any one of the first aspect or the optional implementations of the first aspect of this application, and the receiving device is the receiving device that performs any one of the second aspect or the optional implementations of the second aspect of this application.

An eighth aspect of the embodiments of this application provides a storage medium. It should be noted that the technical solutions of the present disclosure essentially, or the part contributing to the prior art, or all or some of the technical solutions may be implemented in a form of a software product. The computer software product is stored in a storage medium. The storage medium is configured to store a computer software instruction used by the foregoing devices. The computer software instruction includes a program designed for a sending device or a receiving device to perform the first aspect, the second aspect, the third aspect, or the fourth aspect.

The storage medium includes any medium that can store program code, such as a USB flash drive, a removable hard disk, a Read-Only Memory (ROM), a Random Access Memory (RAM), a magnetic disk, or an optical disc.

A ninth aspect of the embodiments of this application provides a computer program product that includes an instruction. When the computer program product runs on a computer, the computer performs the method according to any one of the first aspect or the optional implementations of the first aspect of this application.

A tenth aspect of the embodiments of this application provides a computer program product that includes an instruction. When the computer program product runs on a computer, the computer performs the method according to any one of the second aspect or the optional implementations of the second aspect of this application.

In the technical solutions provided in the embodiments of this application, the embodiments of this application have the following advantages:

In the embodiments of this application, the sending device obtains the data packet. The sending device determines the quality of service of the data packet. The sending device adds the identifier and the sequence number to the data packet based on the quality of service of the data packet. The sending device sends the data packet to which the identifier and the sequence number have been added. The receiving device receives the plurality of data packets, where each of the plurality of data packets includes the first identifier or the second identifier and the corresponding sequence number. The receiving device performs first sorting on the data packets with the first identifier in the plurality of data packets based on the respective sequence numbers, and performs second sorting on the data packets with the second identifier based on the respective sequence numbers. The receiving device provides the plurality of sorted data packets for the upper layer of the receiving device for processing. Because the sending device determines the quality of service based on the data packet and then adds the identifier based on the quality of service, a priority-based scheduling policy of preferably sending a high-priority data packet has been reflected. In this case, the receiving device also correspondingly receives the high-priority data packet first. The receiving device may classify the data packets based on the identifiers included in the data packets, and then re-sort the data packets based on the respective sequence numbers and provide the plurality of re-sorted data packets for the upper layer of the receiving device for processing. Therefore, the receiving device does not need to wait until all data packets sent by the sending device are received and then sort the data packets and send sorted data packets to an upper-layer application for processing. In this way, a QoS mechanism of a network takes effect, user experience of a high-priority application is effectively improved, and time is further saved.

DESCRIPTION OF EMBODIMENTS

The following clearly and describes the technical solutions in the embodiments of this application with reference to the accompanying drawings in the embodiments of this application. Apparently, the described embodiments are merely some but not all of the embodiments of this application. All other embodiments obtained by a person skilled in the art based on the embodiments of this application without creative efforts shall fall within the protection scope of this application.

In the prior art, to resolve an out-of-order problem of multi-path per-packet forwarding, a Network Convergence Protocol (NCP) at a protocol layer is accessed at a user plane network element of a core network and user equipment UE, to number and distribute data packets at a start point of the multi-path forwarding, and converge and sort the multi-path data packets at a convergence point of the multi-path forwarding.

Figure 1:
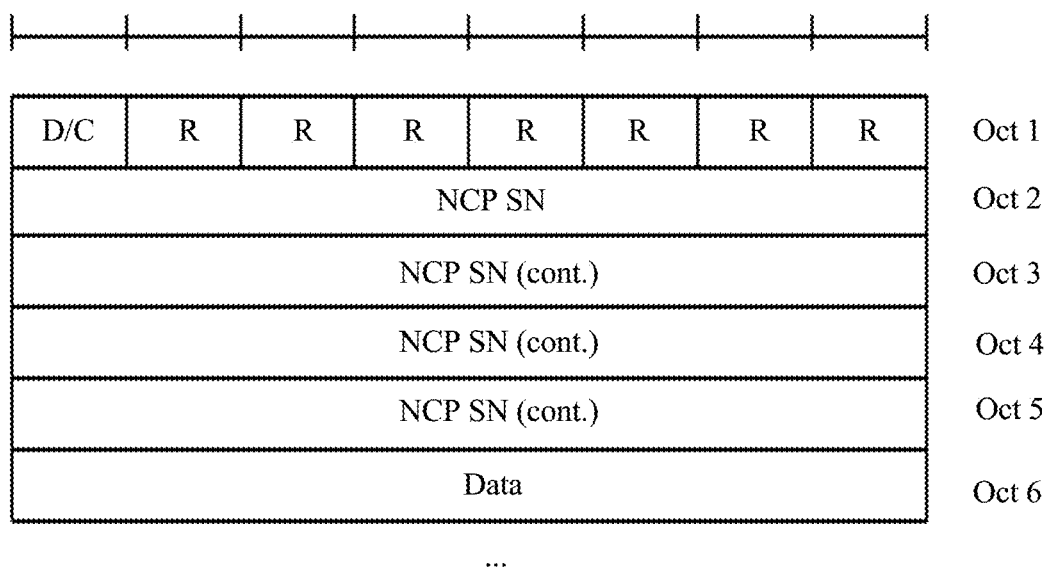
FIG. 1 is a schematic diagram of an existing NCP protocol layer format.

FIG. 1 is a schematic diagram of an NCP protocol layer format, where D indicates a data transfer Protocol Data Unit (PDU), C indicates a control management PDU, R indicates a reserved bit, data indicates a valid payload, and an NCP SN is a network convergence protocol sequence number. A quantity of bits of the SN may be flexibly adjusted based on a performance requirement.

Figure 2:
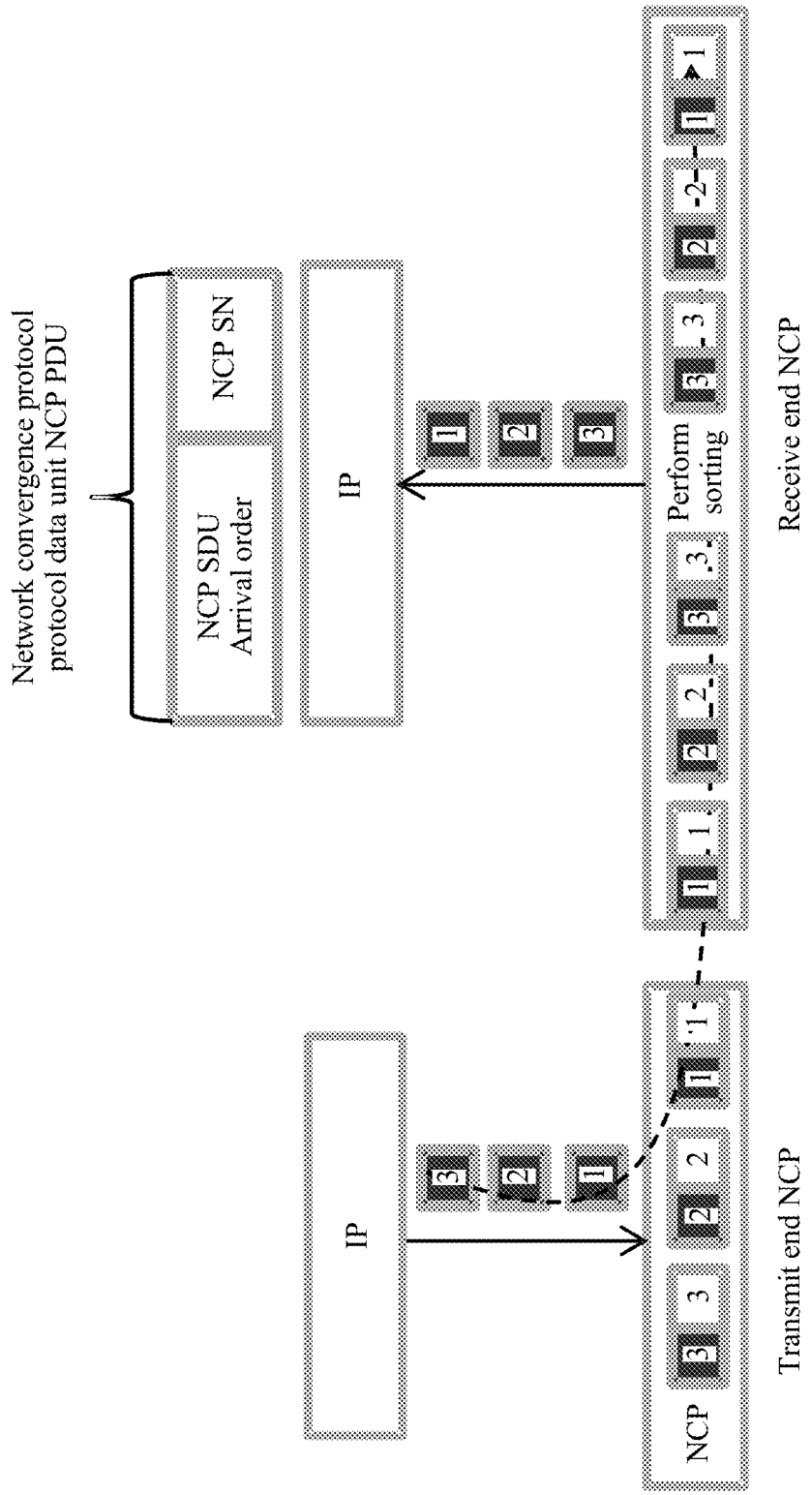
FIG. 2 is a schematic diagram of existing NCP numbering and re-sorting of data packets.

FIG. 2 shows how to number and re-sort data packets in the prior art. An NCP sequentially numbers the data packets. Numbering and re-sorting steps are as follows:

(1) A transmit end NCP numbers IP data packets in an arrival order of the data packets.

(2) The transmit end sends the data packets to a receive end. Because the data packets are sent in a plurality of paths, the data packets are out of order.

(3) The receive end NCP sorts the data packet based on sequence numbers in a protocol header, and delivers sorted data packets to an IP layer for processing.

Figure 3:
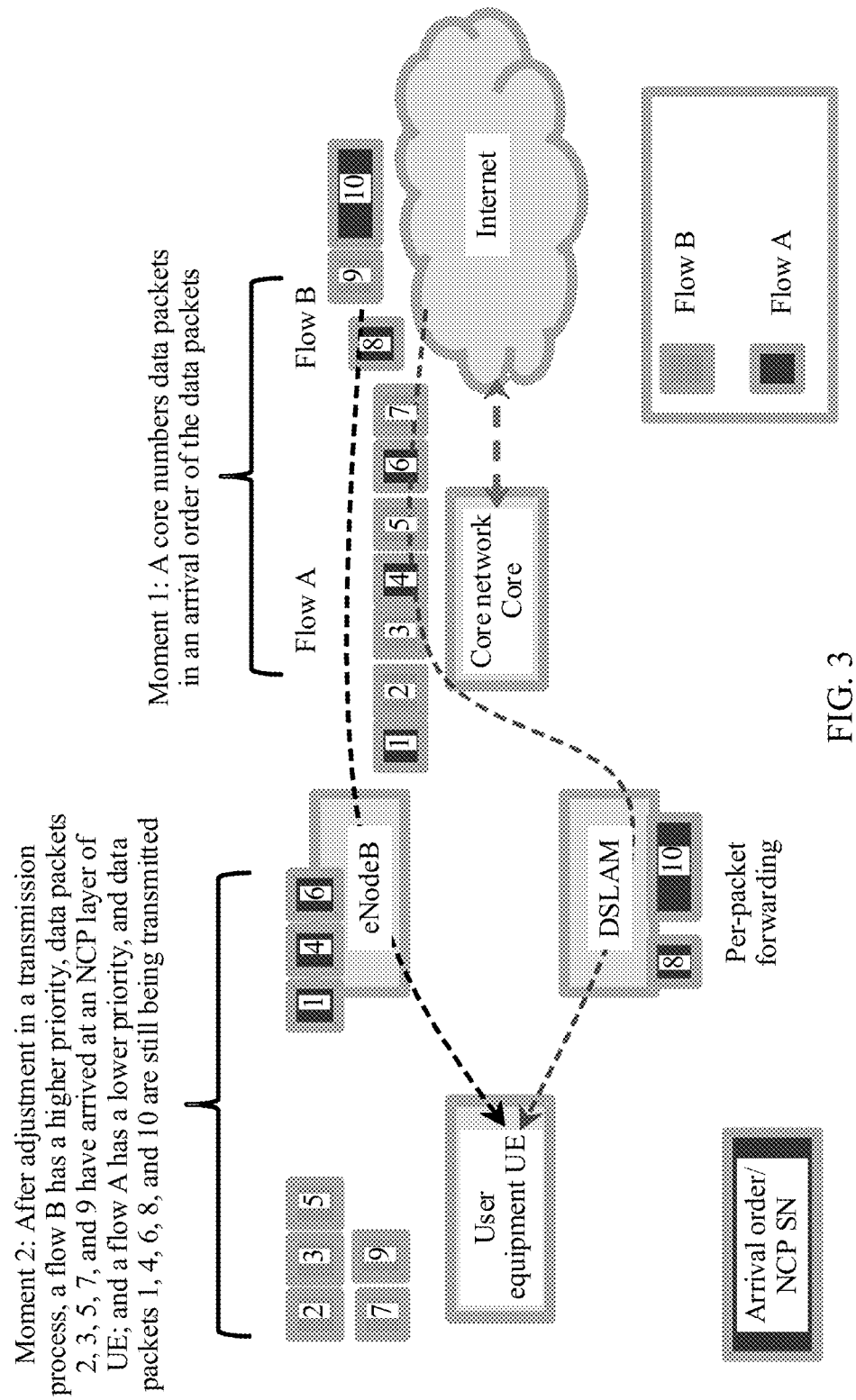
FIG. 3 is another schematic diagram of existing NCP numbering and re-sorting of data packets.

However, NCP numbers cannot reflect service Quality of Service (QoS) indicator information of different flows, and the re-sorting at the receive end causes a failure of a QoS mechanism of a RAN. FIG. 3 is a schematic diagram of NCP numbering and re-sorting in the prior art. An NCP numbers data packets that sequentially arrive. When the data packets arrive at the RAN, a sending order of data packets of different QoS classes changes, and a high-priority data packet preferably arrives on a UE side. However, because the data packets carry NCP numbers, the data packet that preferably arrives at the UE side cannot be delivered to an IP layer and an application layer for processing. Consequently, user experience of a high-priority application is not improved, and QoS scheduling of the RAN does not take effect.

In the embodiments of this application, to overcome impact of existing NCP numbers on the QoS mechanism of the RAN, an existing NCP protocol header is improved. A flow identifier or a QoS identifier may be added to the NCP protocol header. In addition, a numbering manner is optimized, so that data flows of different QoS classes do not affect each other, and a QoS scheduling mechanism of the RAN still takes effect.

Figure 4:
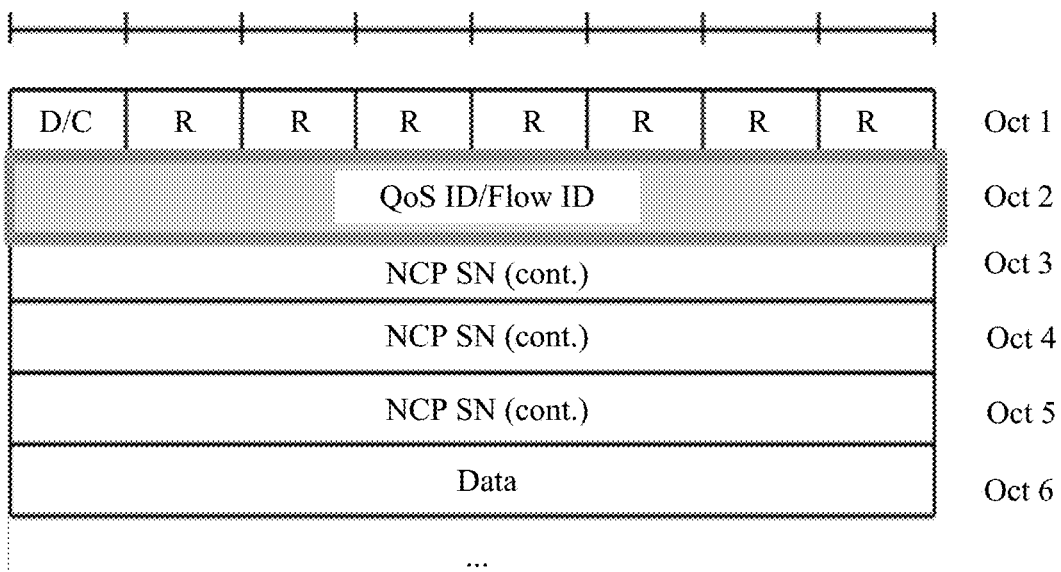
FIG. 4 is a schematic diagram of an NCP protocol layer format according to an embodiment of this application.
Figure 5:
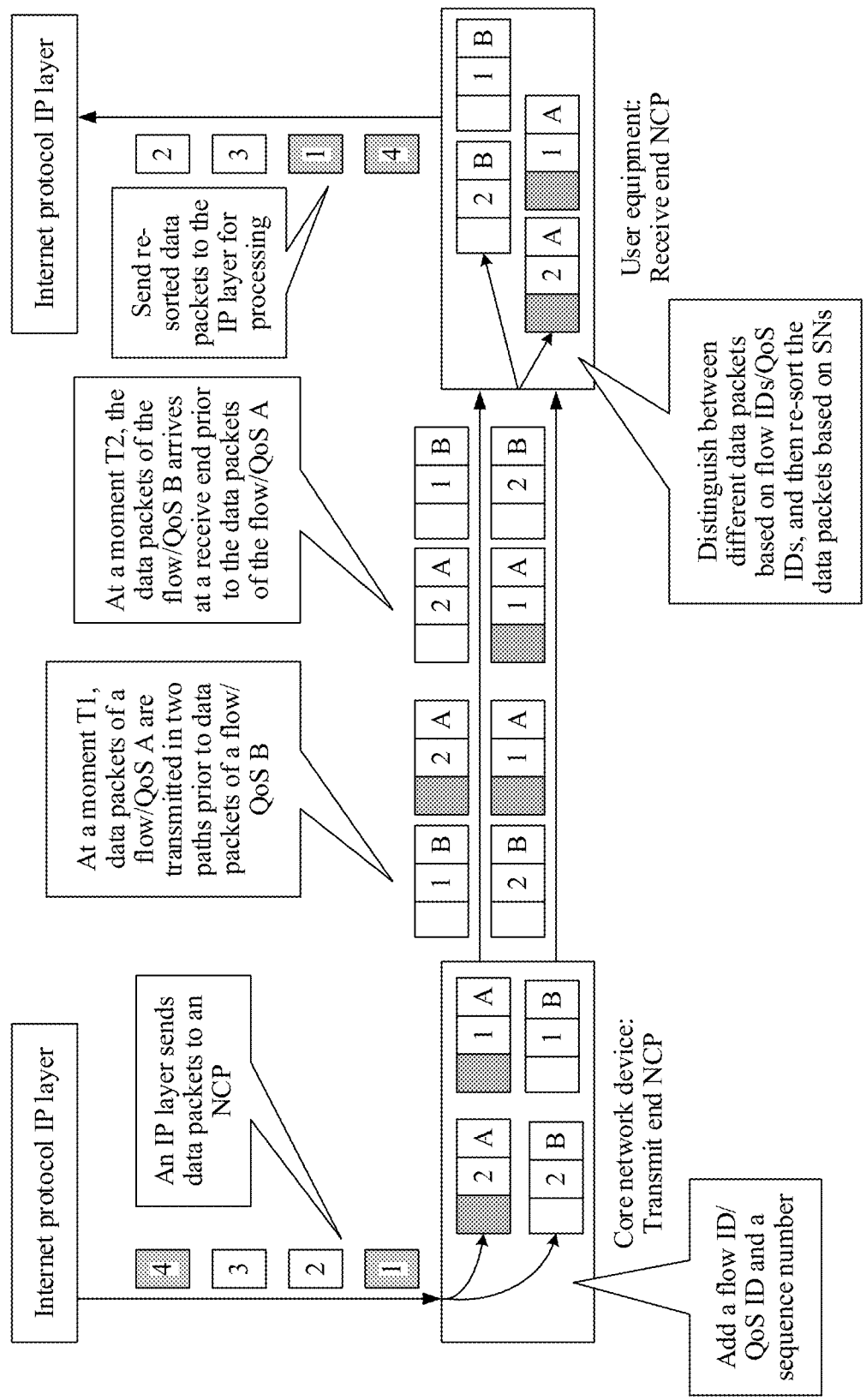
FIG. 5 is a schematic diagram of NCP numbering and re-sorting of data packets according to an embodiment of this application.

In the technical solutions of this application, a flow identifier (Flow ID) or a QoS ID is added to the NCP protocol header, as shown in FIG. 4. FIG. 4 is a schematic diagram of an NCP protocol layer format according to an embodiment of this application. When a transmit end of multi-path forwarding identifies a QoS class or a flow of a data packet, the transmit end adds different IDs based on different QoS classes or flows, and separately numbers data packets of different QoS classes or data packets of different flows. A receive end puts the data packets into different queuing sequences based on the flow/QoS IDs of the data packets, and separately sorts the data packets. It should be noted that when the transmit end is a core network device and the receive end is user equipment UE, the flow/QoS ID may be allocated by a control plane network element in advance, or may be temporarily allocated by a user plane network element; or when the transmit end is user equipment UE and the receive end is a core network device, the flow/QoS ID is allocated by a control plane network element. FIG. 5 is a schematic diagram of NCP numbering and re-sorting according to an embodiment of this application. A system architecture in this embodiment may be an existing Evolved Packet Core (EPC) network system, a future 5G network architecture, or the like. In this solution, an existing NCP solution is improved by adding an identifier bit that identifies a flow or a QoS class to an NCP protocol header and separately numbering data packets of different flows or QoS classes. In this way, mutual impact between different flows can be effectively mitigated, and user experience of a flow application is improved. In addition, a QoS mechanism of a RAN takes effect.

Network elements in this application are shown below:

A base station is an apparatus deployed in the radio access network and configured to provide a wireless communication function for a mobile terminal. The base station may include a macro base station, a micro base station (also referred to as a small cell), a relay station, an access point, and the like in various forms. A device with a base station function may have different names in systems that use different radio access technologies. For example, in an LTE system, the device is referred to as an evolved NodeB (eNB or eNodeB), and in a 3rd generation (3G) system, the device is referred to as a NodeB or the like. For ease of description, in all the embodiments of this application, all the foregoing apparatuses that provide a wireless communication function for the UE are collectively referred to as a base station or an NB.

A control plane CP is a control plane network element. The CP may be a control plane network element in a core network, and provides functions such as policy formulation, session management, and mobility management. The CP may be an integral network element or a collective name of a plurality of control plane network elements in the core network. For example, a Mobility Management Entity (MME), a Policy Charging Rule Function (PCRF), Authentication Authorization Accounting (AAA), and the like are all control plane network elements. The CP may be all or some of the control plane network elements.

A user plane UP is a user plane network element. The UP performs data forwarding, processing, and the like.

Figure 6:
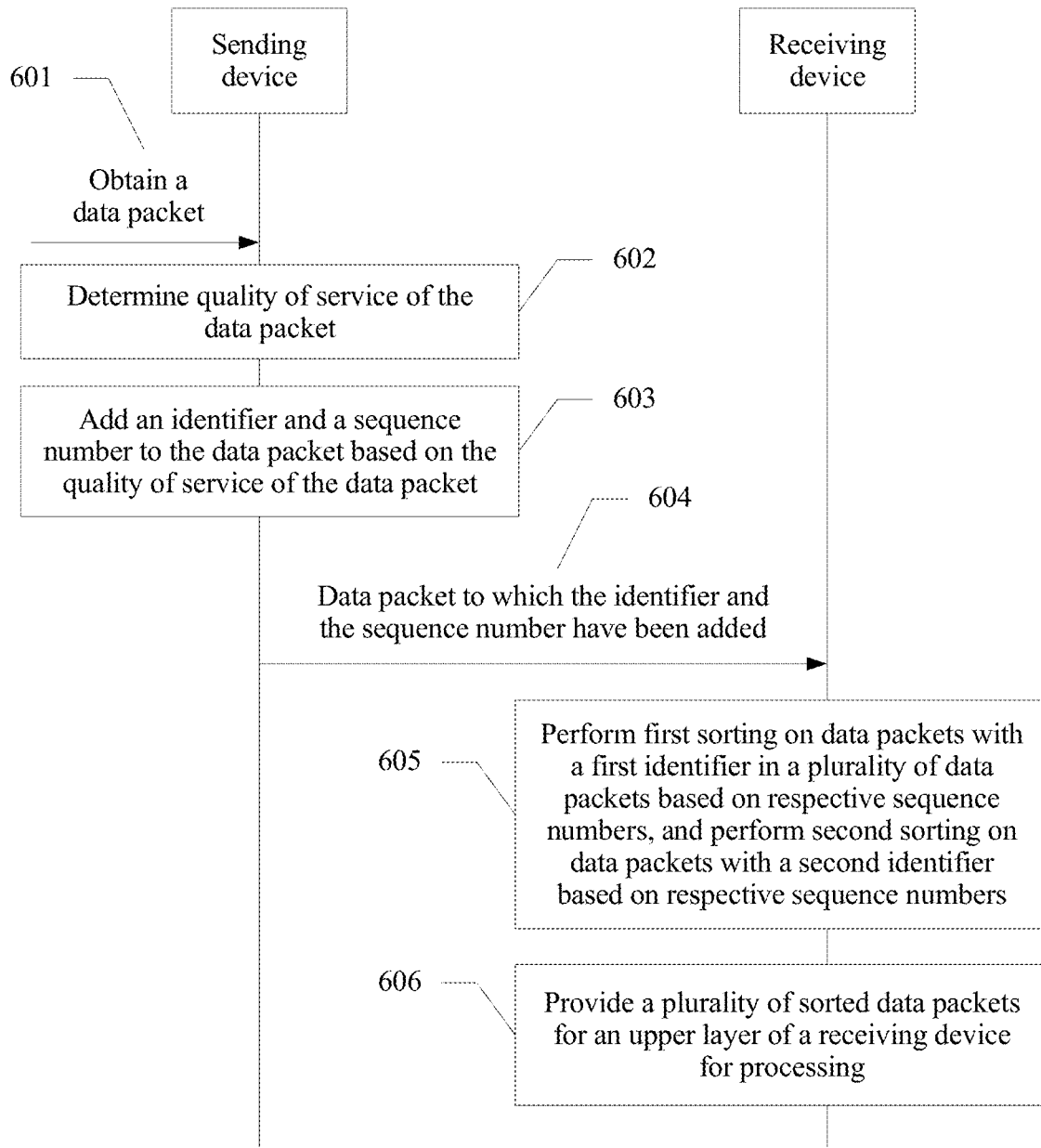
FIG. 6 is a schematic diagram of an embodiment of a data packet transmission method according to an embodiment of this application.

The following further describes the technical solutions of this application by using embodiments. FIG. 6 is a schematic diagram of an embodiment of a data packet transmission method according to an embodiment of this application. The method includes the following steps.

601. A sending device obtains a data packet.

In this embodiment of this application, if the sending device is a core network device, a receiving device is user equipment, and the sending device obtains a downlink data packet; or if the sending device is user equipment, a receiving device is a core network device, and the sending device obtains a uplink data packet. A quantity of obtained data packets is not limited herein, and there may be one or more data packets. In an actual downlink application, the core network device that serves as the sending device may be a gateway (GW).

602. The sending device determines quality of service of the data packet.

In this embodiment of this application, the sending device determines the quality of service of the data packet. For example, the sending device determines a Traffic Flow Template (TFT) based on internet protocol IP quintuple information of the data packet; or the sending device determines a first flow type based on IP quintuple information of the data packet. It should be understood that the IP quintuple information herein includes a source IP address, a source port, a destination IP address, a destination port, and a transport layer protocol.

603. The sending device adds an identifier and a sequence number to the data packet based on the quality of service of the data packet, where if the quality of service of the data packet belongs to first quality of service, the sending device adds a first identifier and a first sequence number to the data packet; or if the quality of service of the data packet belongs to second quality of service, the sending device adds a second identifier and a second sequence number to the data packet.

In this embodiment of this application, the sending device adds the identifier and the sequence number to the data packet based on the quality of service of the data packet. For example, the sending device adds the identifier and the sequence number to a network convergence protocol header of the data packet based on the quality of service of the data packet, as shown in FIG. 4. Herein, it should be noted that an English full name of the network convergence protocol may be Network Convergence Protocol, NCP for short in English, or may be another name, and may be determined based on a protocol name in an actual application.

If the quality of service of the data packet belongs to the first quality of service, the sending device adds the first identifier and the first sequence number to the data packet; or if the quality of service of the data packet belongs to the second quality of service, the sending device adds the second identifier and the second sequence number to the data packet. The first quality of service is different from the second quality of service. The sending device independently numbers data packets belonging to the first quality of service and data packets belonging to the second quality of service. The first sequence number and the second sequence number may be the same or different.

In an actual application, the sending device may add the identifier and the sequence number to the data packet based on the quality of service of the data packet in the following implementations:

(1) The sending device obtains a first quality of service identifier based on the first traffic flow template; and the sending device adds the first quality of service identifier and the sequence number to the data packet.

(2) The sending device obtains a first flow type identifier based on the first flow type; and the sending device adds the first flow type identifier and the sequence number to the data packet.

For example, the sending device receives 20 data packets. Quality of service of five data packets belongs to the first quality of service, quality of service of seven data packets belongs to the second quality of service, and quality of service of eight data packets belongs to third quality of service. In this case, the sending device adds the first identifier and corresponding sequence numbers to the five data packets belonging to the first quality of service. The sequence numbers of the five data packets may be consecutive, ascending, or descending. For example, the sequence numbers are [1, 2, 3, 4, 5], [1, 3, 5, 7, 9], or [20, 16, 12, 8, 4]. The sending device adds the second identifier and corresponding sequence numbers to the seven data packets belonging to the second quality of service. Sequence numbers of the seven data packets also comply with the foregoing rule and may be consecutive, ascending, or descending. For example, the sequence numbers are [a, b, c, d, e, f, g] or [5, 6, 7, 8, 9, 10, 11]. The sending device adds a third identifier and corresponding sequence numbers to the eight data packets belonging to the third quality of service. Numbers of the eight data packets also comply with the foregoing rule. Details are not described herein again.

It should be noted that a rule for numbering data packets by the sending device needs to be negotiated by the sending device and the receiving device in advance, or a numbering rule may be carried in a data packet to notify the receiving device. Further, the sending device may determine corresponding quality of service provided that the data packet is received, and then add a corresponding identifier and sequence number based on the quality of service, or the sending device may wait until a specific quantity of data packets are received, and then separately add identifiers and sequence numbers. This is not specifically limited herein.

The sending device adds a quality of service identifier and a sequence number or a flow type identifier and a sequence number based on the quality of service of the data packet. This is equivalent to transmitting the data packet according to a scheduling policy. In this case, during data packet transmission in a RAN, a high-priority data packet is preferably sent, and then a low-priority data packet is sent.

604. The sending device sends, to a receiving device, the data packet to which the identifier and the sequence number have been added.

In this embodiment of this application, step 604 may include the following step a and step b:

a. The sending device sends the data packet to which the identifier and the sequence number have been added.

b. The receiving device receives a plurality of data packets, where each of the plurality of data packets includes the first identifier or the second identifier and a corresponding sequence number.

It should be understood that the identifier herein may be a quality of service identifier or another identifier such as a flow type identifier.

605. The receiving device performs first sorting on data packets with the first identifier in a plurality of data packets based on respective sequence numbers, and performs second sorting on data packets with the second identifier based on respective sequence numbers.

In this embodiment of this application, after the receiving device receives the plurality of data packets, where each data packet includes the corresponding identifier and sequence number, the receiving device puts the data packets into corresponding queues based on the identifiers of the data packets, and re-sorts the data packets based on the respective sequence numbers, because the data packets are out of order in a process in which the data packets are transmitted in the RAN. The identifier may include a quality of service identifier or another identifier such as a flow type identifier. For example, step 605 may include: the receiving device performs first sorting on the data packets with the first identifier in the plurality of data packets according to a sequence number consecutiveness, ascending, or descending rule, and performs second sorting on the data packets with the second identifier according to a sequence number consecutiveness, ascending, or descending rule.

It should be noted that because the sending device sends the data packet based on the identifier that is added based on the quality of service of the data packet, the receiving device does not need to wait until all data packets sent by the sending device are received and then re-sort the data packets and send re-sorted data packets to an upper-layer application for processing. The receiving device can provide data packets belonging to a same identifier in the received plurality of data packets for the upper-layer application of the receiving device for processing, provided that sequence numbers of the data packets are consecutive, ascending, or descending. A high-priority data packet usually preferably arrives at the receiving device. The receiving device may re-sort data packets based on identifiers and sequence numbers, and then may correspondingly first send re-sorted data packets to the upper-layer application for processing, without waiting until all data packets arrive. In this way, a QoS mechanism of a network takes effect, and user experience of a high-priority application is effectively improved.

For example, based on the example in step 603, if the receiving device currently receives 11 data packets with two identifiers, including the first identifier and the second identifier, and the receiving device receives no data packet belonging to the third identifier because a priority of the data packet is the lowest, where five data packets belong to the first identifier, and six data packets belong to the second identifier, the receiving device puts the 11 data packets into two queues based on the different identifiers, re-sorts the five data packets with the first identifier based on respective sequence numbers, and re-sorts the six data packets with the second identifier based on respective sequence numbers.

606. The receiving device provides a plurality of sorted data packets for an upper layer of the receiving device for processing.

In this embodiment of this application, the receiving device provides the plurality of sorted data packets for the upper layer (an IP layer or an application layer) of the receiving device for processing. For example, the receiving device provides the five re-sorted data packets [1, 2, 3, 4, 5], [1, 3, 5, 7, 9], or [20, 16, 12, 8, 4] with the first identifier for the upper layer of the receiving device for processing, and provides the six re-sorted data packets [a, b, c, d, e, f], [b, c, d, e, f, g], [5, 6, 7, 8, 9, 10], or [6, 7, 8, 9, 10, 11] with the second identifier for the upper layer of the receiving device for processing.

In this embodiment of this application, the sending device obtains the data packet. The sending device determines the quality of service of the data packet. The sending device adds the identifier and the sequence number to the data packet based on the quality of service of the data packet. The sending device sends the data packet to which the identifier and the sequence number have been added. The receiving device receives the plurality of data packets, where each of the plurality of data packets includes the first identifier or the second identifier and the corresponding sequence number. The receiving device performs first sorting on the data packets with the first identifier in the plurality of data packets based on the respective sequence numbers, and performs second sorting on the data packets with the second identifier based on the respective sequence numbers. The receiving device provides the plurality of sorted data packets for the upper layer of the receiving device for processing. Because the sending device determines the quality of service based on the data packet and then adds the identifier based on the quality of service, a priority-based scheduling policy of preferably sending a high-priority data packet has been reflected. In this case, the receiving device also correspondingly receives the high-priority data packet first. The receiving device may classify the data packets based on the identifiers included in the data packets, and then re-sort the data packets based on the respective sequence numbers and provide the plurality of re-sorted data packets for the upper layer of the receiving device for processing. Therefore, the receiving device does not need to wait until all data packets sent by the sending device are received and then sort the data packets and send sorted data packets to the upper-layer application for processing. In this way, a QoS mechanism of the RAN takes effect, user experience of a high-priority application is effectively improved, and time is further saved.

Figure 7:
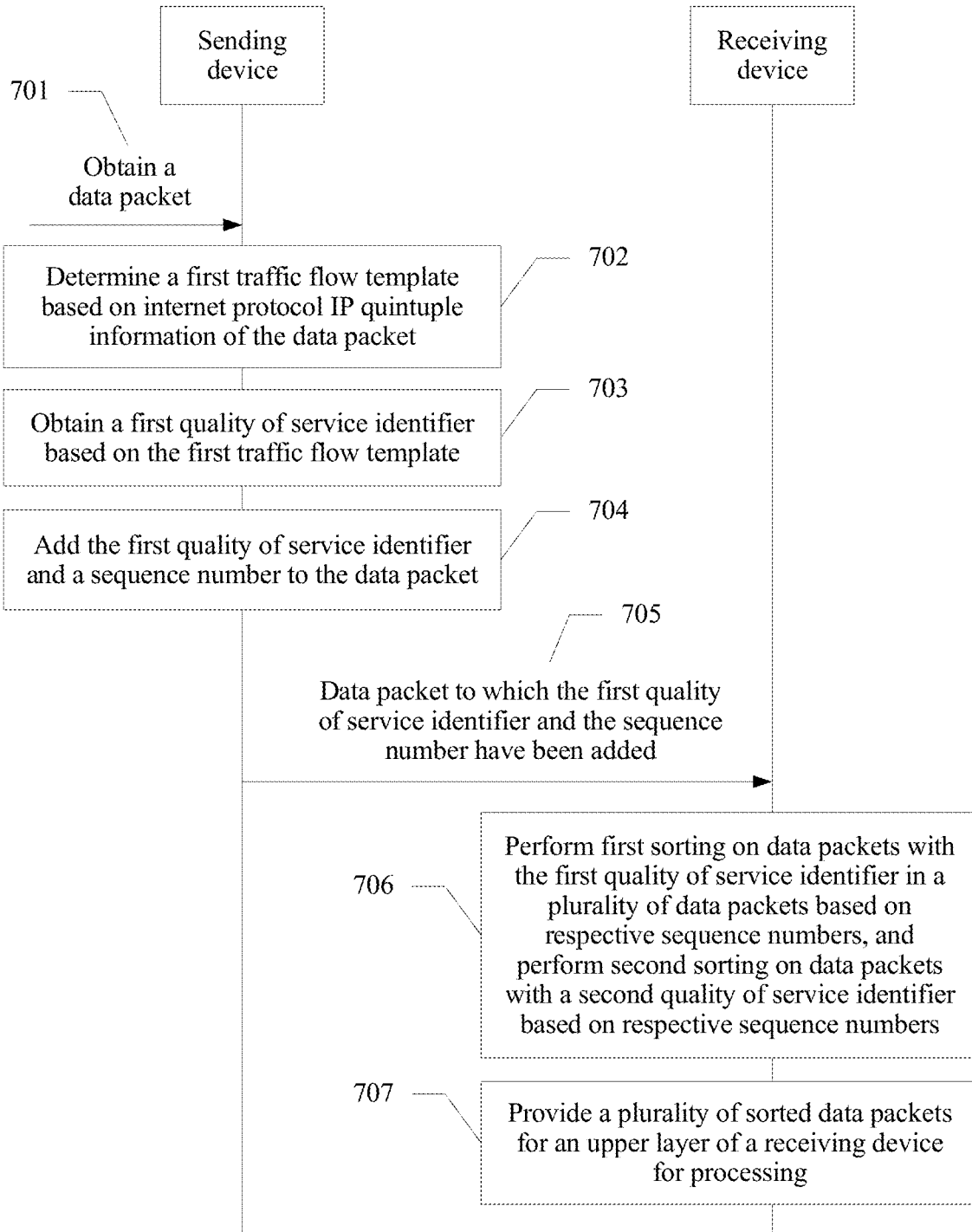
FIG. 7 is a schematic diagram of another embodiment of a data packet transmission method according to an embodiment of this application.

FIG. 7 is a schematic diagram of another embodiment of a data packet transmission method according to an embodiment of this application. The method includes the following steps.

701. A sending device obtains a data packet.

In this embodiment of this application, if the sending device is a core network device, a receiving device is user equipment, and the sending device obtains a downlink data packet; or if the sending device is user equipment, a receiving device is a core network device, and the sending device obtains an uplink data packet. A quantity of obtained data packets is not limited herein, and there may be one or more data packets. In an actual application, the data packet may be obtained by a gateway of the sending device.

702. The sending device determines a first traffic flow template based on internet protocol IP quintuple information of the data packet.

In this embodiment of this application, after obtaining the data packet, the sending device determines the first traffic flow template based on the internet protocol IP quintuple information of the data packet. It should be understood that the IP quintuple information herein includes a source IP address, a source port, a destination IP address, a destination port, and a transport layer protocol.

703. The sending device obtains a first quality of service identifier based on the first traffic flow template.

In this embodiment of this application, the sending device may obtain the first quality of service identifier based on the first traffic flow template in the following implementations:

(1) The sending device determines, based on a preset first mapping information table between a traffic flow template and a quality of service identifier, the first quality of service identifier corresponding to the first traffic flow template.

In this example of this application, the preset first mapping information table between a traffic flow template and a quality of service identifier is described first. The quality of service identifier (QoS ID) is allocated by a control plane network element CP of the sending device in a process of initiating an attachment request or a session creation request. After receiving the QoS ID, a user plane network element UP sets up a correspondence between the QoS ID and a TFT.

For example, in a bearer setup procedure, after receiving a create bearer request "Create bearer request" sent by the CP, a GW of the UP creates a TFT, allocates a Tunnel Endpoint Identifier (TED) and a QoS ID, and sets up a mapping relationship between the TFT and the QoS ID.

For example, Table 1 shows the preset first mapping information table between a traffic flow template and a quality of service identifier.

TABLE 1

| Traffic flow template TFT | Quality of service QoS | QoS ID |
|---|---|---|
| First traffic flow template: {(192.168.1.1: 10000, 121.14.88.76: 80, TCP), (192.168.1.1: 10000, 121.14.88.77: 80, TCP), . . .} | Packet delay budget: 100 ms Packet error loss rate: 10^-2 Priority: 2 | 1 |
| Second traffic flow template: {(192.168.1.2: 10000, 121.14.88.76: 80, TCP), (192.168.1.2: 10000, 121.14.88.77: 80, TCP), . . .} | Packet delay budget: 150 ms Packet error loss rate: 10^-3 Priority: 4 | 2 |
| Third traffic flow template: {(192.168.1.3: 10000, 121.14.88.76: 80, TCP), (192.168.1.3: 10000, 121.14.88.77: 80, TCP), . . .} | Packet delay budget: 50 ms Packet error loss rate: 10^-3 Priority: 3 | 3 |

It should be noted that each traffic flow template may correspond to a plurality of pieces of IP quintuple information. In other words, each traffic flow template may correspond to one or more pieces of IP quintuple information. After determining the corresponding first traffic flow template based on the IP quintuple information of the data packet, the sending device may search the preset first mapping information table between a traffic flow template and a quality of service identifier, to obtain the first quality of service identifier corresponding to the first traffic flow template.

For example, if the IP quintuple information of the received data packet is 192.168.1.1:10000, a traffic flow template of the data packet is the first traffic flow template, Table 1 is searched based on the first traffic flow template, and a corresponding quality of service QoS ID 1 may be obtained; or if the IP quintuple information of the received data packet is 192.168.1.3:10000, a traffic flow template of the data packet is a third traffic flow template, Table 1 is searched based on the third traffic flow template, and a corresponding quality of service QoS ID 3 may be obtained. Search manners for other data packets are similar to this. Details are not described herein again.

(2) The sending device searches a stored second mapping information table between a traffic flow template and a quality of service identifier, and if the first quality of service identifier corresponding to the first traffic flow template is found, the sending device obtains the first quality of service identifier; or if the first quality of service identifier corresponding to the first traffic flow template is not found, the sending device allocates the first quality of service identifier corresponding to the first traffic flow template, and the sending device adds mapping information between the first traffic flow template and the first quality of service identifier to the second mapping information table.

In this example of this application, data packets are numbered based on QoS IDs, mapping information between a QoS ID and a TFT is stored in a UP in real time, and the user plane network element UP temporarily allocates a correspondence between a QoS ID and a TFT. In other words, the second mapping information table between a traffic flow template and a quality of service identifier is updated in real time. When a traffic flow template corresponding to a currently received data packet is not received before, a corresponding QoS ID is allocated to the currently received data packet, and a mapping relationship between the traffic flow template and the QoS ID is stored in the second mapping information table. If a data packet with the same traffic flow template is received subsequently, the sending device does not need to re-allocate a QoS ID, but directly searches the second mapping information table to obtain the QoS ID.

It should be noted that the second mapping information table herein is similar to Table 1, except that Table 1 is preset and the second mapping information table is initially an empty table in which no corresponding mapping information is stored. The mapping information is stored by the sending device in real time in a data packet transmission process.

(3) The sending device determines a corresponding quality of service class identifier QCI based on the first traffic flow template, and the sending device converts the QCI to obtain the first quality of service identifier.

In this example of this application, QoS IDs of data packets are in a one-to-one correspondence with Quality of service Class Identifier (QCI). In this way, the QoS ID can be indicated by using only a limited quantity of bits. For example, in an existing EPC, all QCIs can be indicated by using only 4 bits. As a scale value, the QCI is used to measure behavior (for example, a packet loss rate or a packet delay budget) of forwarding a specific packet provided for an service data flow (SDF), and is also applied to a Guaranteed Bit Rate (GBR) bearer and a Non-Guaranteed Bit Rate (Non-GBR) bearer, to specify a control bearer packet forwarding manner (for example, a scheduling weight, an admission threshold, a queue management threshold, or a link layer protocol configuration) defined in an access node. All these manners are pre-configured by an operator in the access node.

704. The sending device adds the first quality of service identifier and a sequence number to the data packet.

In this embodiment of this application, the sending device adds the first quality of service identifier and the sequence number to the data packet. For example, step 704 may include: the sending device adds the first quality of service identifier and the sequence number to a network convergence protocol header of the data packet, that is, as shown in FIG. 4, only the flow ID is replaced with a QoS ID. The following continues to separately describe the three examples in step 703:

(1) After a DL data packet arrives at a GW, and the GW searches, based on the first traffic flow template, the preset first mapping information table for the QoS ID corresponding to the first traffic flow template, an NCP layer of the GW adds the NCP protocol header to the data packet. The NCP protocol header includes the QoS ID and the sequence number (SN). To be specific, Table 1 may be searched for the corresponding QoS ID, and if the QoS ID corresponding to the data packet is 1, the quality of service identifier 1 and the sequence number are added to the data packet. The sequence number herein is obtained by numbering the data packet based on a sequence number of a previous data packet with the quality of service identifier 1. If previous data packets with the quality of service identifier 1 have been numbered 1, 2, 3, 4, and 5, the current sequence number is 6. Therefore, protocol header information added to the data packet is the QoS ID 1 and the sequence number 6.

(2) A DL data packet arrives at a GW, and an NCP layer of the GW adds the NCP protocol header to the data packet. The NCP protocol header includes the QoS ID and the SN. For example, after determining the corresponding TFT based on the IP quintuple information, the gateway checks the second mapping information table between a TFT and a QoS ID. If the QoS ID corresponding to the TFT is not found, the GW allocates the QoS ID corresponding to the TFT, records a mapping relationship between the QoS ID and the TFT, and stores the mapping relationship in the second mapping information table; or if the QoS ID corresponding to the TFT is found, the GW directly provides the QoS ID for the NCP layer for use. When the data packet is encapsulated, the QoS ID is encapsulated into the NCP protocol header.

(3) A DL data packet arrives at a GW, and an NCP layer of the GW adds the NCP protocol header to the data packet. The NCP protocol header includes the QoS ID and the SN. For the QoS ID herein, the GW of the sending device determines the quality of service class identifier QCI based on the first traffic flow template, and then converts the quality of service class identifier QCI to obtain the QoS ID. In this example of this application, there are relatively few queuing sequences. For example, there are nine QoS QCIs in the existing EPC and the nine QoS QCIs can be indicated by using only 4 bits.

705. The sending device sends, to a receiving device, the data packet to which the first quality of service identifier and the sequence number have been added.

In this embodiment of this application, step 705 may include the following step a and step b:

a. The sending device sends the data packet to which the first quality of service identifier and the sequence number have been added.

b. The receiving device receives a plurality of data packets, where each of the plurality of data packets includes the first quality of service identifier or a second quality of service identifier and a corresponding sequence number.

Specifically, the GW sends, according to a scheduling policy, the data packet to a base station (NodeB, NB), a digital subscriber line access multiplexer (DSLAM), a router, or the like. The NB, the DSLAM, the router, or the like sends the data packet to UE. The receive end UE distinguishes between different data packets based on QoS IDs and puts the data packets into unused queuing sequences.

706. The receiving device performs first sorting on data packets with the first quality of service identifier in a plurality of data packets based on respective sequence numbers, and performs second sorting on data packets with a second quality of service identifier based on respective sequence numbers.

In this embodiment of this application, that the receiving device performs first sorting on data packets with the first quality of service identifier in a plurality of data packets based on respective sequence numbers, and performs second sorting on data packets with the second quality of service identifier based on respective sequence numbers may include: the receiving device performs first sorting on the data packets with the first quality of service identifier in the plurality of data packets according to a sequence number consecutiveness, ascending, or descending rule, and performs second sorting on the data packets with the second quality of service identifier according to a sequence number consecutiveness, ascending, or descending rule. In other words, after the UE receives the data packets, an NCP protocol layer of the UE divides the data packets into different QoS queues based on QoS IDs carried in NCP headers, and re-sorts data packets in a same queue based on SNs of the data packets.

707. The receiving device provides a plurality of sorted data packets for an upper layer of the receiving device for processing.

In this embodiment of this application, the receiving device provides the plurality of sorted data packets for the upper layer (an IP layer or an application layer) of the receiving device for processing.

In this embodiment of this application, the sending device obtains the data packet. The sending device determines the first traffic flow template based on the internet protocol IP quintuple information of the data packet. The sending device obtains the first quality of service identifier based on the first traffic flow template. The sending device adds the first quality of service identifier and the sequence number to the data packet. The sending device sends the data packet to which the first quality of service identifier and the sequence number have been added. The receiving device receives the plurality of data packets, where each of the plurality of data packets includes the first quality of service identifier or the second quality of service identifier and the corresponding sequence number. The receiving device performs first sorting on the data packets with the first quality of service identifier in the plurality of data packets based on the respective sequence numbers, and performs second sorting on the data packets with the second quality of service identifier based on the respective sequence numbers. The receiving device provides the plurality of sorted data packets for the upper layer of the receiving device for processing. Because the sending device determines the first traffic flow template based on the data packet and then determines the quality of service identifier based on the first traffic flow template and adds the quality of service identifier to the protocol header of the data packet, a priority-based scheduling policy of preferably sending a high-priority data packet has been reflected. In this case, the receiving device also correspondingly receives the high-priority data packet first. The receiving device may classify the data packets based on the quality of service identifiers included in the data packets, and then re-sort the data packets based on the respective sequence numbers and provide the plurality of re-sorted data packets for the upper layer of the receiving device for processing. Therefore, the receiving device does not need to wait until all data packets sent by the sending device are received and then sort the data packets and send sorted data packets to an upper-layer application for processing. In this way, a QoS mechanism of a RAN takes effect, user experience of a high-priority application is effectively improved, and time is further saved.

Figure 8:
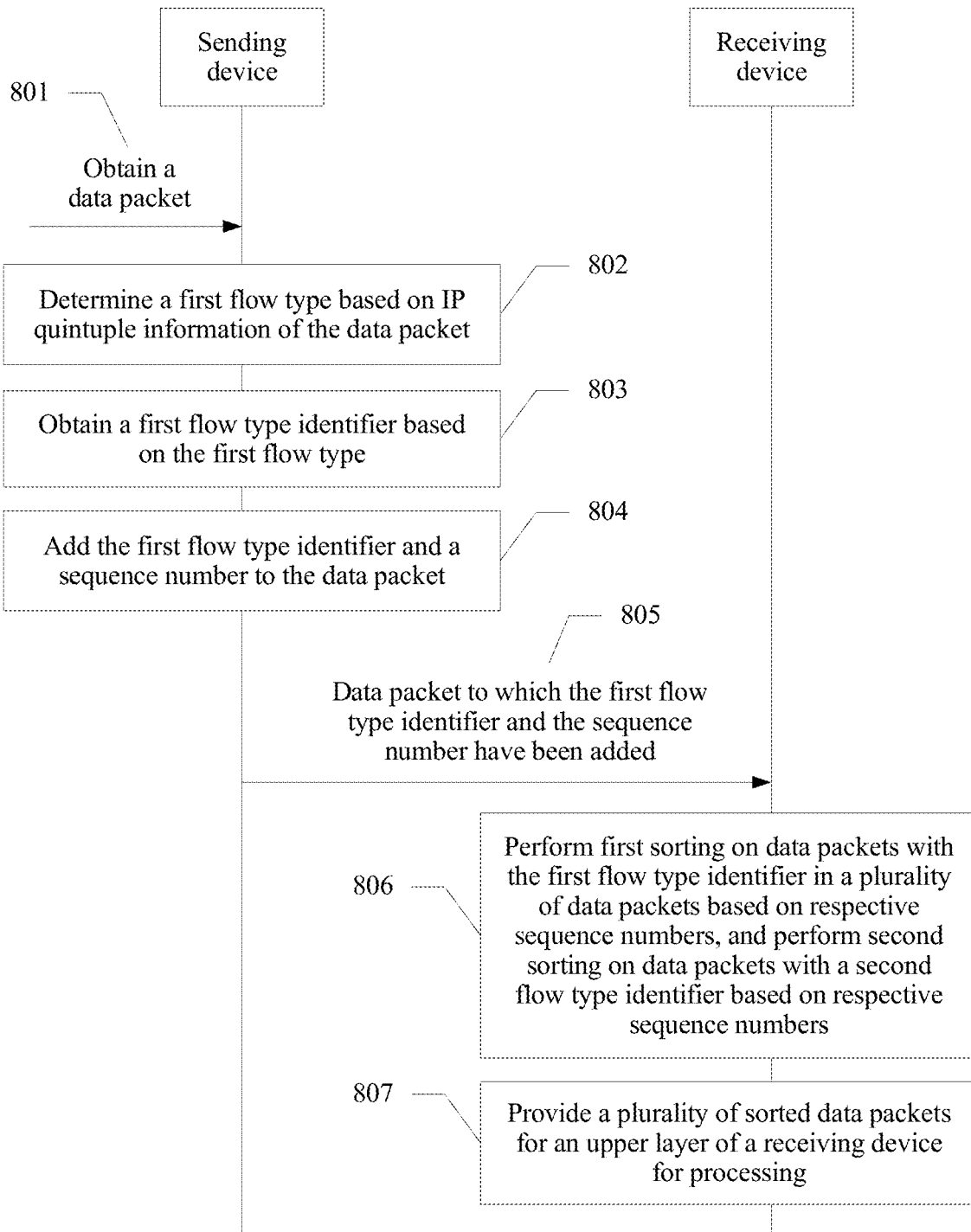
FIG. 8 is a schematic diagram of another embodiment of a data packet transmission method according to an embodiment of this application.

FIG. 8 is a schematic diagram of another embodiment of a data packet transmission method according to an embodiment of this application. The method includes the following steps.

801. A sending device obtains a data packet.

In this embodiment of this application, if the sending device is a core network device, a receiving device is user equipment, and the sending device obtains a downlink data packet; or if the sending device is user equipment, a receiving device is a core network device, and the sending device obtains an uplink data packet. A quantity of obtained data packets is not limited herein, and there may be one or more data packets. In an actual application, the data packet may be obtained by a gateway of the sending device.

802. The sending device determines a first flow type based on IP quintuple information of the data packet.

In this embodiment of this application, after obtaining the data packet, the sending device determines the first flow type based on the internet protocol IP quintuple information of the data packet. It should be understood that the IP quintuple information herein includes a source IP address, a source port, a destination IP address, a destination port, and a transport layer protocol.

803. The sending device obtains a first flow type identifier based on the first flow type.

In this embodiment of this application, the sending device may obtain the first flow type identifier based on the first flow type in the following implementations:

The sending device searches a stored correspondence information table between a flow type and a flow type identifier, and if the first flow type identifier corresponding to the first flow type is found, the sending device obtains the first flow type identifier. The sending device searches a stored correspondence information table between a flow type and a flow type identifier, and if the first flow type identifier corresponding to the first flow type is not found, the sending device allocates the first flow type identifier corresponding to the first flow type, and the sending device adds a correspondence between the first flow type and the first flow type identifier to the correspondence information table.

In this example of this application, data packets are numbered based on flow IDs, a UP temporarily allocates a correspondence between a flow ID and IP quintuple information, and the UP stores correspondence information between a flow ID and IP quintuple information in real time.

804. The sending device adds the first flow type identifier and a sequence number to the data packet.

In this embodiment of this application, the sending device adds the first flow type identifier and the sequence number to the data packet. Step 804 may include: the sending device adds the first flow type identifier and the sequence number to a network convergence protocol header of the data packet, as shown in FIG. 4.

The following provides a description by using a downlink data packet as an example. The DL data packet arrives at the GW, and an NCP layer of the GW adds the NCP protocol header to the data packet, including a flow ID and an SN. Specific steps are as follows: The gateway searches for, based on IP quintuple information of the data packet, the flow ID corresponding to the data packet, and if the flow ID corresponding to the IP quintuple information can be found, the gateway directly sends the flow ID to the NCP layer for use; or if the flow ID corresponding to the IP quintuple information is not found, the gateway allocates the flow ID for the IP quintuple information, and records a correspondence between the IP quintuple information and the flow ID. The gateway encapsulates the flow ID and the SN into the NCP header. The SN may increase by one or have another numbering manner. A manner for an uplink data packet is similar to this. Details are not described herein.

805. The sending device sends, to a receiving device, the data packet to which the first flow type identifier and the sequence number have been added.

In this embodiment of this application, step 805 may include the following step a and step b:

a. The sending device sends the data packet to which the first flow type identifier and the sequence number have been added.

b. The receiving device receives a plurality of data packets, where each of the plurality of data packets includes the first flow type identifier or a second flow type identifier and a corresponding sequence number.

For example, the GW sends, according to a scheduling policy, the data packet to a base station (NodeB, NB), a digital subscriber line access multiplexer (DSLAM), a router, or the like. The NB, the DSLAM, the router, or the like sends the data packet to UE. The receive end UE distinguishes between different data packets based on flow IDs and puts the data packets into unused queuing sequences.

806. The receiving device performs first sorting on data packets with the first flow type identifier in a plurality of data packets based on respective sequence numbers, and performs second sorting on data packets with a second flow type identifier based on respective sequence numbers.

In this embodiment of this application, that the receiving device performs first sorting on data packets with the first flow type identifier in a plurality of data packets based on respective sequence numbers, and performs second sorting on the data packets with a second flow type identifier based on respective sequence numbers may include: the receiving device performs first sorting on the data packets with the first flow type identifier in the plurality of data packets according to a sequence number consecutiveness, ascending, or descending rule, and performs second sorting on the data packets with the second flow type identifier according to a sequence number consecutiveness, ascending, or descending rule. In other words, after the UE receives the data packets, an NCP protocol layer of the UE divides the data packets into different flow queues based on flow IDs carried in NCP headers, and re-sorts data packets in a same queue based on SNs of the data packets.

807. The receiving device provides a plurality of sorted data packets for an upper layer of the receiving device for processing.

In this embodiment of this application, the receiving device provides the plurality of sorted data packets for the upper layer (an IP layer or an application layer) of the receiving device for processing.

In this embodiment of this application, the sending device obtains the data packet. The sending device determines the first flow type based on the internet protocol IP quintuple information of the data packet. The sending device obtains the first flow type identifier based on the first flow type. The sending device adds the first flow type identifier and the sequence number to the data packet. The sending device sends the data packet to which the first flow type identifier and the sequence number have been added. The receiving device receives the plurality of data packets, where each of the plurality of data packets includes the first flow type identifier or the second flow type identifier and the corresponding sequence number. The receiving device performs first sorting on the data packets with the first flow type identifier in the plurality of data packets based on the respective sequence numbers, and performs second sorting on the data packets with the second flow type identifier based on the respective sequence numbers. The receiving device provides the plurality of sorted data packets for the upper layer of the receiving device for processing. Because the sending device determines the flow type based on the data packet and then determines the flow type identifier based on the flow type and adds the flow type identifier to the protocol header of the data packet, a priority-based scheduling policy of preferably sending a high-priority data packet has been reflected. In this case, the receiving device also correspondingly receives the high-priority data packet first. The receiving device may classify the data packets based on the flow type identifiers included in the data packets, and then re-sort the data packets based on the respective sequence numbers and provide the plurality of re-sorted data packets for the upper layer of the receiving device for processing. Therefore, the receiving device does not need to wait until all data packets sent by the sending device are received and then sort the data packets and send sorted data packets to an upper-layer application for processing. In this way, a QoS mechanism of a RAN takes effect, user experience of a high-priority application is effectively improved, and time is further saved.

Figure 9:
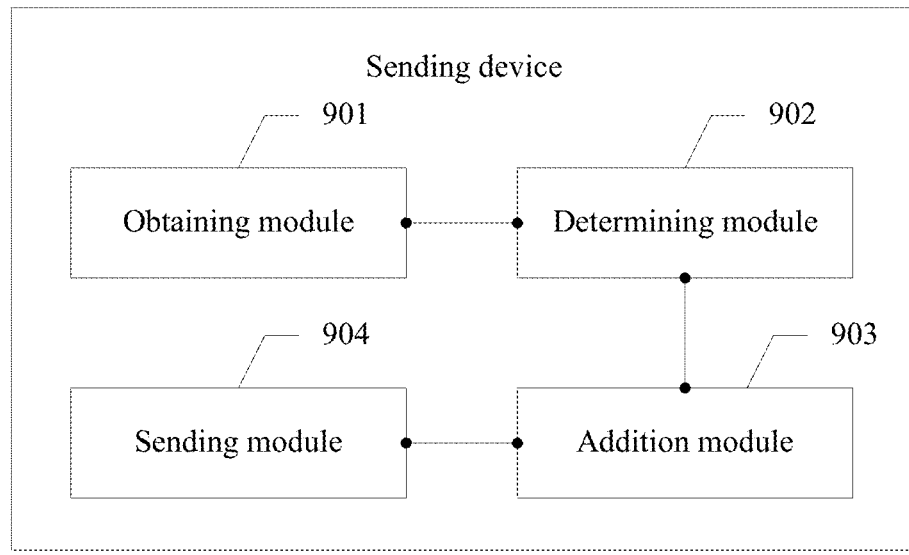
FIG. 9 is a schematic diagram of an embodiment of a sending device according to an embodiment of this application.

The foregoing describes the data packet transmission method in the embodiments of this application. The following describes a sending device and a receiving device in the embodiments of this application. FIG. 9 is a schematic diagram of an embodiment of a sending device according to an embodiment of this application. The sending device may include:

an obtaining module 901, configured to obtain a data packet; a determining module 902, configured to determine quality of service of the data packet;

an addition module 903, configured to add an identifier and a sequence number to the data packet based on the quality of service of the data packet, where if the quality of service of the data packet belongs to first quality of service, the addition module adds a first identifier and a first sequence number to the data packet; or if the quality of service of the data packet belongs to second quality of service, the sending device adds a second identifier and a second sequence number to the data packet; and a sending module 904, configured to send the data packet to which the identifier and the sequence number have been added.

Optionally, in some embodiments of this application:

the determining module 902 is further configured to perform steps 702 and 703 in FIG. 7 and steps 802 and 803 in FIG. 8;

the addition module 903 is further configured to perform step 704 in FIG. 7 and step 804 in FIG. 8; and the sending module 904 is further configured to perform step a included in step 705 in FIG. 7 and step a included in step 805 in FIG. 8.

Figure 10:
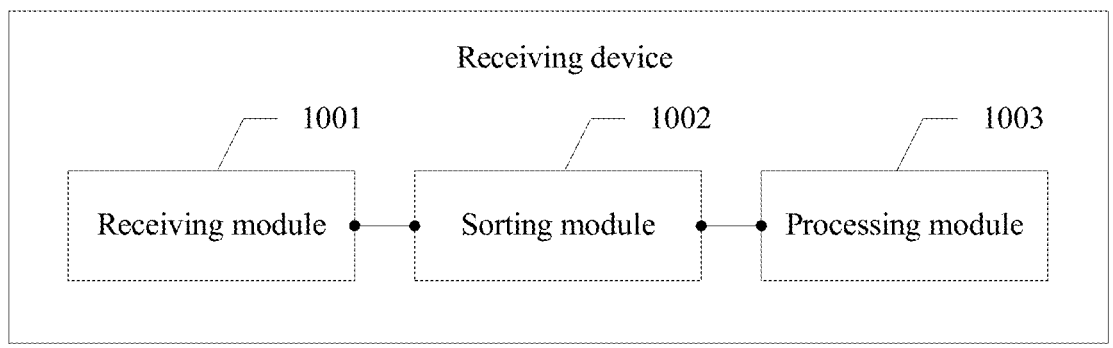
FIG. 10 is a schematic diagram of an embodiment of a receiving device according to an embodiment of this application.

FIG. 10 is a schematic diagram of an embodiment of a receiving device according to an embodiment of this application. The receiving device may include:

a receiving module 1001, configured to receive a plurality of data packets, where each of the plurality of data packets includes a first identifier or a second identifier and a corresponding sequence number;

a sorting module 1002, configured to: perform first sorting on data packets with a first identifier in a plurality of data packets based on respective sequence numbers, and perform second sorting on data packets with a second identifier based on respective sequence numbers; and a processing module 1003, configured to provide a plurality of sorted data packets for an upper layer of the receiving device for processing.

Optionally, in some embodiments of this application, the first identifier or the second identifier includes a quality of service identifier or a flow type identifier.

Optionally, in some embodiments of this application:

the receiving module 1001 is further configured to perform step b included in step 705 in FIG. 7 and step b included in step 805 in FIG. 8; and the sorting module 1002 is further configured to perform step 706 in FIG. 7 and step 806 in FIG. 8.

Figure 11:
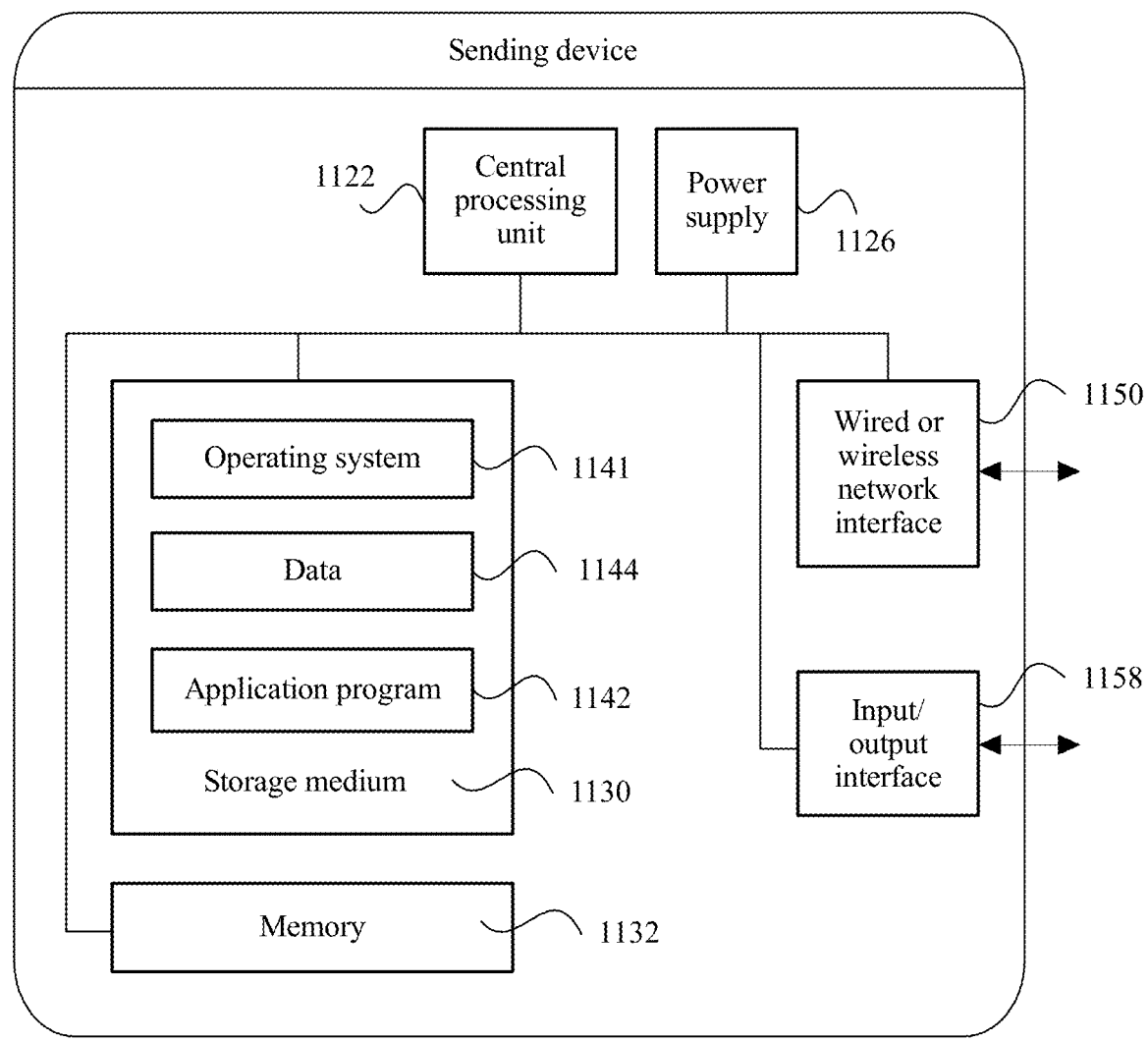
FIG. 11 is a schematic diagram of another embodiment of a sending device according to an embodiment of this application.

FIG. 11 is a schematic diagram of an embodiment of a sending device according to an embodiment of this application.

The sending device may vary greatly due to different configurations or performance, and may include one or more central processing unit (CPU) 1122 (for example, one or more processors), a memory 1132, and one or more storage media 1130 (for example, one or more mass storage devices) that store an application program 1142 or data 1144. The memory 1132 and the storage medium 1130 may perform temporary storage or permanent storage. The program stored in the storage medium 1130 may include one or more modules (not shown in the figure), and each module may include a series of instruction operations performed on the sending device. Further, the central processing unit 1122 may be configured to communicate with the storage medium 1130, and perform the series of instruction operations in the storage medium 1130.

The sending device may further include one or more power supplies 1126, one or more wired or wireless network interfaces 1150, one or more input/output interfaces 1158, and/or one or more operating systems 1141, for example, Windows Server™, Mac OS X™, UNIX™, Linux, or FreeBSD.

The steps performed by the sending device in the foregoing embodiments may be based on a structure of the sending device shown in FIG. 11.

Figure 12:
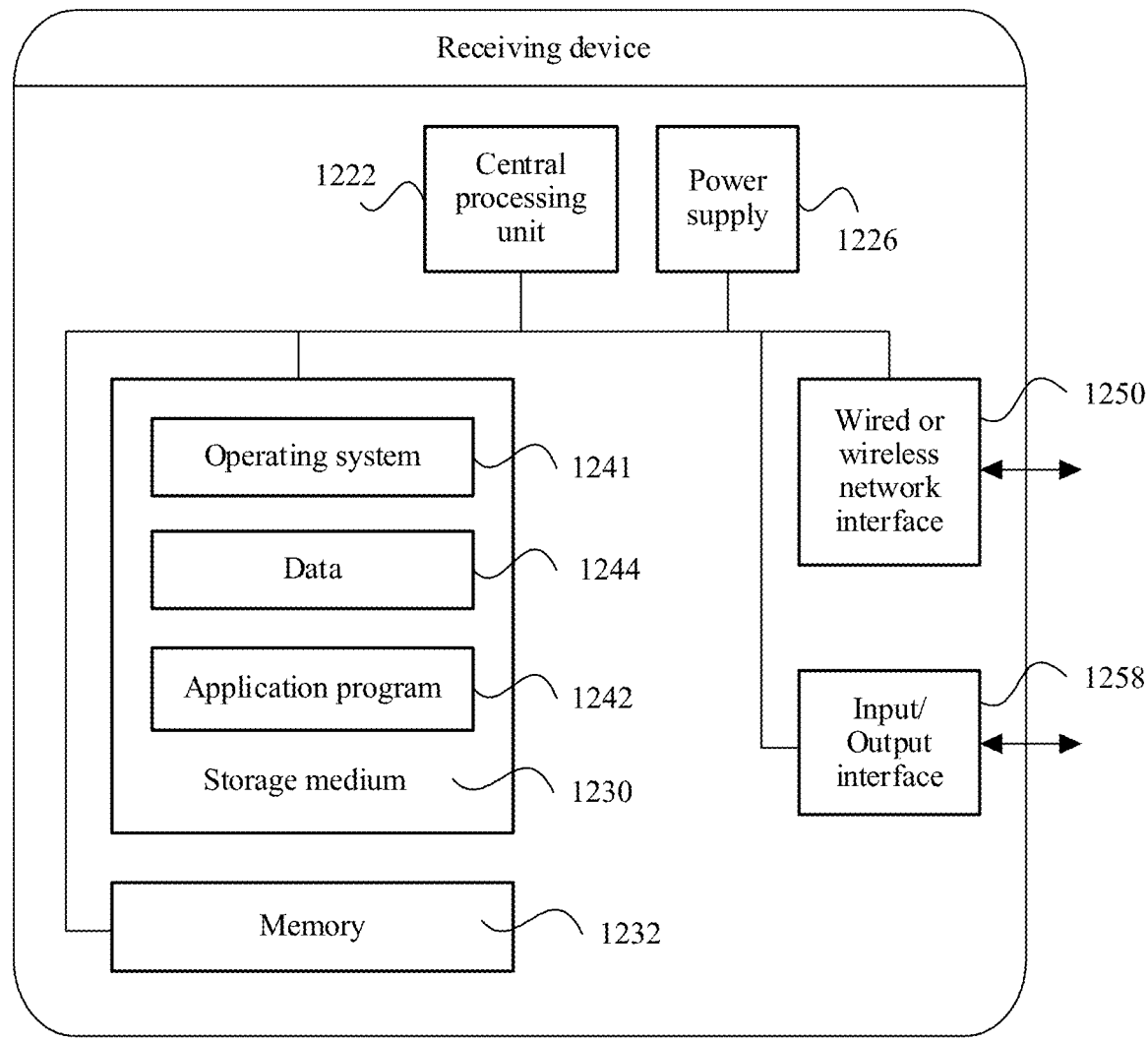
FIG. 12 is a schematic diagram of another embodiment of a receiving device according to an embodiment of this application.

FIG. 12 is a schematic diagram of an embodiment of a receiving device according to an embodiment of this application.

The receiving device may vary greatly due to different configurations or performance, and may include one or more central processing units (CPUs) 1222 (for example, one or more processors), a memory 1232, and one or more storage media 1230 (for example, one or more mass storage devices) that store an application program 1242 or data 1244. The memory 1232 and the storage medium 1230 may perform temporary storage or permanent storage. The program stored in the storage medium 1230 may include one or more modules (not shown in the figure), and each module may include a series of instruction operations performed on the receiving device. Further, the central processing unit 1222 may be configured to communicate with the storage medium 1230, and perform the series of instruction operations in the storage medium 1230.

The receiving device may further include one or more power supplies 1226, one or more wired or wireless network interfaces 1250, one or more input/output interfaces 1258, and/or one or more operating systems 1241, for example, Windows Server™, Mac OS X™, UNIX™, Linux™, or FreeBSD™.

The steps performed by the receiving device in the foregoing embodiments may be based on a structure of the receiving device shown in FIG. 12.

All or some of the foregoing embodiments may be implemented by software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD), or the like.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

What is claimed is:

1. A data packet transmission method, comprising:
   obtaining, by a sending device, a data packet;
   determining, by the sending device, a quality of service of the data packet, wherein determining the quality of service of the data packet comprises determining a first traffic flow template based on internet protocol (IP) quintuple information of the data packet;
   adding, by the sending device, an identifier and a sequence number to the data packet based on the quality of service of the data packet, wherein in response to determining that the quality of service of the data packet belongs to a first quality of service, the sending device adds a first identifier and a first sequence number to the data packet, and in response to determining that the quality of service of the data packet belongs to a second quality of service, the sending device adds a second identifier and a second sequence number to the data packet; and
   sending, by the sending device, the data packet that includes the identifier and the sequence number that have been added to the data packet;
   wherein the identifier comprises the first quality of service identifier; and
   wherein adding, by the sending device, the identifier and the sequence number to the data packet comprises:
      obtaining, by the sending device, the first quality of service identifier based on the first traffic flow template by: searching, by the sending device, a first mapping information table between a traffic flow template and a quality of service identifier, and, in response to determining that the first quality of service identifier corresponding to the first traffic flow template is found in the first mapping information table, obtaining, by the sending device, the first quality of service identifier; and
      adding, by the sending device, the first quality of service identifier and the first sequence number to the data packet.

2. The method according to claim 1, wherein the adding, by the sending device, the identifier and the sequence number to the data packet comprises:
   adding, by the sending device, the identifier and the sequence number to a network convergence protocol header of the data packet based on the quality of service of the data packet.

3. A sending device, comprising:
   a receiver, configured to receive a data packet; and
   a processor, configured to:
      determine a quality of service of the data packet, wherein determining the quality of service of the data packet comprises determining a first traffic flow template based on internet protocol (IP) quintuple information of the data packet; and
      add an identifier and a sequence number to the data packet based on the quality of service of the data packet, wherein in response to determining that the quality of service of the data packet belongs to a first quality of service, the processor adds a first identifier and a first sequence number to the data packet, and in response to determining that the quality of service of the data packet belongs to a second quality of service, the processor adds a second identifier and a second sequence number to the data packet; and
   a transmitter, configured to send the data packet that includes the identifier and the sequence number that have been added to the data packet;
   wherein the identifier comprises the first quality of service identifier; and
   wherein adding the identifier and the sequence number to the data packet comprises:
      obtaining the first quality of service identifier based on the first traffic flow template by: searching a first mapping information table between a traffic flow template and a quality of service identifier, and, in response to determining that the first quality of service identifier corresponding to the first traffic flow template is found in the first mapping information table, obtaining the first quality of service identifier; and
      adding the first quality of service identifier and the first sequence number to the data packet.

4. The sending device according to claim 3, wherein the identifier and the sequence number are added to a network convergence protocol header of the data packet based on the quality of service of the data packet.

5. A data packet transmission method, comprising:
   obtaining, by a sending device, a data packet;
   determining, by the sending device, a quality of service of the data packet, wherein determining the quality of service of the data packet comprises determining a first traffic flow template based on internet protocol (IP) quintuple information of the data packet;
   adding, by the sending device, an identifier and a sequence number to the data packet based on the quality of service of the data packet, wherein in response to determining that the quality of service of the data packet belongs to a first quality of service, the sending device adds a first identifier and a first sequence number to the data packet, and in response to determining that the quality of service of the data packet belongs to a second quality of service, the sending device adds a second identifier and a second sequence number to the data packet; and sending, by the sending device, the data packet that includes the identifier and the sequence number that have been added to the data packet;

wherein the identifier comprises the first quality of service identifier; and wherein adding, by the sending device, the identifier and the sequence number to the data packet comprises:
   obtaining, by the sending device, the first quality of service identifier based on the first traffic flow template by: searching, by the sending device, a first mapping information table between a traffic flow template and a quality of service identifier; in response to determining that the first quality of service identifier corresponding to the first traffic flow template is not found in the first mapping information table, allocating the first quality of service identifier corresponding to the first traffic flow template; and, adding mapping information between the first traffic flow template and the first quality of service identifier to the first mapping information table; and adding, by the sending device, the first quality of service identifier and the first sequence number to the data packet.

6. The method according to claim 5, wherein the adding, by the sending device, the identifier and the sequence number to the data packet comprises:
   adding, by the sending device, the identifier and the sequence number to a network convergence protocol header of the data packet based on the quality of service of the data packet.

* * * * *